United States Patent Office 3,280,149
Patented Oct. 18, 1966

3,280,149
17-OXYGENATED ESTR-5(10)-EN-3-ONES AND INTERMEDIATES
Christopher J. Jung, Morton Grove, and Raphael Pappo, Skokie, Ill., assignors to G. D. Searle & Co., Chicago, Ill., a corporation of Delaware
No Drawing. Filed May 24, 1965, Ser. No. 458,466
19 Claims. (Cl. 260—343.2)

This application is a continuation-in-part of copending application Serial No. 347,696 filed February 27, 1964.

The present invention is concerned with novel unsaturated steroidal lactones and especially with 17-oxygenated estr-5(10)-en-3-ones represented by the following structural formula

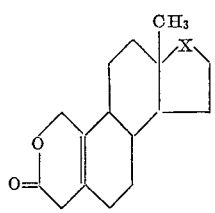

wherein X can be a carbonyl, β-hydroxymethylene, β-(lower alkanoyl)oxy methylene, α-(lower alkyl)-β-hydroxymethylene or α-(lower alkyl)-β-(lower alkanoyl)-oxymethylene radical.

The lower alkyl radicals encompassed by the foregoing representation are typified by methyl, ethyl, propyl, butyl, pentyl, hexyl, heptyl and the branched-chain groups isomeric therewith. Examples of lower alkanoyl groups depicted therein are formyl, acetyl, propionyl, butyryl, valeryl, caproyl, heptanoyl and the corresponding branched-chain isomers.

A process particularly suitable for the production of the instant compounds involves the use of starting materials of the following structural formula

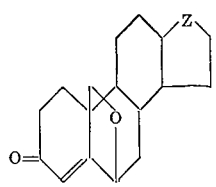

wherein Z can be a carbonyl, β-hydroxymethylene or β-(lower alkanoyl)oxymethylene radical. As a specific example, 6β,19-epoxyandrost-4-ene-3,17-dione is dehydrogenated by heating with dichlorodicyanoquinone to afford the corresponding 1,4-diene. Hydroxylation of the 1,2-double bond with potassium chlorate in the presence of osmium tetroxide followed by cleavage of the resulting 1,2-diol with lead tetraacetate yields 6β,19-epoxy-1,17-dioxo-1,2-seco-A-nor-5α-androst-3-en-2-oic acid. Reduction of that aldehydo acid with sodium borohydride followed by acidification and heating affords 6β,19-epoxy-17β-hydroxy-2-oxaandrost-4-en-3-one. The 6β,19-epoxy group is cleaved by reaction with zinc and cupric acetate to afford 17β,19 - dihydroxy - 2 - oxaandrost-5-en-3-one. Chromic acid oxidation of that substance results in 10β-carboxy-2-oxaandrost-5-ene-3,17-dione, which is heated in aqueous pyridine at the reflux temperature to produce 2-oxaandrost-5(10)-ene-3,17-dione.

Alternatively the 17-hydroxy function of 6β,19-epoxy-17β-hydroxy-2-oxaandrost-4-en-3-one is oxidized with aqueous chromic acid and the 6β,19-epoxy group is cleaved by means of zinc and cupric acetate to afford 19-hydroxy-2-oxaandrost-4-ene-3,17-dione together with 19-hydroxy-2-oxaandrost-5-ene-3,17-dione. Oxidation of either the Δ⁴ or Δ⁵ substance with aqueous chromic acid followed by decarboxylation of the resulting 10β-carboxy intermediate by heating with pyridine yields 2-oxaestr-5(10)-ene-3,17-dione.

The reaction of the aforementioned 2-oxaestr-5(10)-ene-3,17-dione with a suitable reagent results in selective reduction of the 17-keto group. Thus, that substance is contacted with sodium borohydride and aqueous sodium hydroxide in methanol at about 60° to produce 17β-hydroxy-2-oxaestr-5(10)-en-3-one.

The instant 17-alkylated compounds are conveniently produced by allowing a salt of the aforementioned 2-oxaestr-5(10)-ene-3,17-dione to react with a suitable organometallic reagent. As a specific example, that substance is contacted with magnesium hydroxide to yield the magnesium salt of 1-hydroxy-17-oxo-1,2-seco-A-nor-estr-5(10)-en-2-oic acid. That salt is allowed to react with methylmagnesium bromide in tetrahydrofuran, and the resulting adduct is acidified to afford 17β-hydroxy-17α-methyl-2-oxaestr-5(10)-en-3-one.

The 17-(lower alkanoyl)oxy compounds of the present invention are conveniently produced by acylation of the corresponding 17-hydroxy derivative, typically with a lower alkanoic acid anhydride or halide, preferably in the presence of a suitable acid acceptor. As a specific example, 17β-hydroxy-2-oxaestr-5(10)-en-3-one is allowed to react with acetic anhydride and pyridine to afford the corresponding 17-acetate.

The compounds of this invention are useful in view of their valuable pharmacological properties. They are hormonal agents, for example, as evidenced by their anabolic activity. In addition, they exhibit anti-bacterial and anti-protozoal properties as is apparent from their ability to inhibit the growth of such organisms as *Diplococcus pneumoniae* and *Tetrahymena gelleii*.

The invention will appear more fully from the examples which follow. These examples are set forth by way of illustration only, and it will be understood that the invention is not to be construed as limited either in spirit or in scope by the details contained therein as many modifications both in materials and methods will be apparent from this disclosure to those skilled in the art. In these examples, temperatures are given in degrees centigrade (° C.). Quantities of materials are expressed in parts by weight unless otherwise noted.

*Example 1*

To a solution of 67 parts of 6β,19-epoxyandrost-4-ene-3,17-dione in 2200 parts of benzene is added 67 parts of dichlorodicyanobenzoquinone and 1.09 parts of p-toluenesulfonic acid, and the resulting reaction mixture is heated in a nitrogen atmosphere at the reflux temperature with stirring for about 19 hours. The mixture is then cooled and filtered, and the filtrate is evaporated to a small volume, then is washed successively with dilute aqueous sodium sulfite, dilute aqueous sodium hydroxide, and water, dried over anhydrous sodium sulfate, and stripped of solvent at reduced pressure. The resulting solid residue is dissolved in benzene, and that organic solution is passed through a column of aluminum silicate. Removal of the solvent by distillation at reduced pressure and crystallization of the resulting residue from isopropyl alcohol yields 6β,19-epoxyandrosta-1,4-diene - 3,17 - dione, melting at about 164.5–166.5°. A pure sample, melting at about 167.5–169.5°, is obtained by further recrystallization from benzene.

Example 2

To a solution of 50 parts of 6β,19-epoxyandrosta-1,4-diene-3,17-dione in 546 parts of tertiary-butyl alcohol is added 8.5 parts of potassium chlorate, 4.25 parts of osmium tetroxide, and 700 parts of water. The resulting reaction mixture is allowed to stand at room temperature for about 11 days, at the end of which time 0.5 part of potassium chlorate is added, and the mixture is stirred at 0–5° for about 3 hours. The crystalline product which separates from the mixture is collected by filtration and dried to afford 6β,19-epoxy-1,2-dihydroxyandrost-4-ene-3,17-dione, melting at about 243–246° with decomposition.

Concentration of the latter filtrate to approximately ⅓ volume results in the separation of additional crystalline material. These crystals are collected by filtration and washed on the filter with benzene to yield additional crude product, melting at about 230–235°. A further quantity of crude product is obtained from the latter filtrate by dilution with chloroform, washing of that organic solution successively with dilute aqueous sodium hydroxide and water, drying over anhydrous sodium sulfate, and removal of the solvent by distillation at reduced pressure. The crystalline residue obtained in that manner is washed with benzene to afford the crude 1,2-diol, melting at about 227–233°.

Example 3

To a solution of 44 parts of 6β,19-epoxy-1,2-dihydroxyandrost-4-ene-3,17-dione in 739 parts of acetic acid containing 176 parts of water is added 202 parts of lead tetraacetate, and the temperature is maintained below 56° by cooling. When the exothermic reaction has subsided, the reaction mixture is heated at 50–56° for about 1½ hours, then is cooled to room temperature, and 2.4 parts of formic acid is added in order to decompose excess lead tetraacetate. Removal of the solvent by distillation at reduced pressure affords a residue which is partitioned between water and chloroform. The organic layer is separated, then is washed with water, dried over anhydrous sodium sulfate and concentrated to dryness at reduced pressure. Crystallization of the residue from benzene affords the solvated crude product, which displays a double melting point at about 130–135° and 228–233°. Recrystallization from ethyl acetate affords pure 6β,19-epoxy-1,17-dioxo-1,2-seco-A-norandrost-3-en-2-oic acid, which displays a melting point at about 222–224.5°, and is represented by the following structural formula

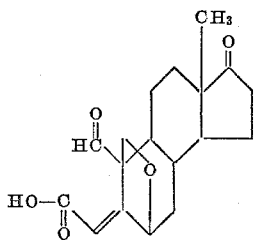

Example 4

To a solution of 40 parts of 6β,19-epoxy-1,17-dioxo-1,2-seco-A-norandrost-3-en-2-oic acid in 456 parts of chloroform is added at 0–5°, a solution of 26 parts of sodium borohydride in 312 parts of water. The resulting reaction mixture is stirred at room temperature for about 4 hours, then is diluted with water. The aqueous layer contains the sodium salt of 6β,19-epoxy-1,17β-dihydroxy-1,2-seco-A-norandrost-3-en-2-oic acid, and that hydroxy-acid is precipitated by acidification of the aqueous solution with hydrochloric acid. That precipitate is isolated by filtration and recrystallized from pyridine-ether, thus affording 6β,19-epoxy-1,17β-dihydroxy-1,2-seco-A-norandrost-3-en-2-oic acid, which melts at about 188–191°, resolidifies and melts again at about 204–207°. It is further characterized by the following structural formula

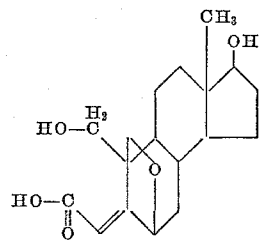

The aqueous solution containing the sodium salt of the hydroxy acid can be used directly to obtain the corresponding lactone. Thus, that solution is diluted with 200 parts of water and 240 parts of concentrated hydrochloric acid, then is heated at 90–100° for about 30 minutes. Cooling of this reaction mixture followed by extraction with chloroform affords an organic solution which is washed with water, dried over anhydrous sodium sulfate, and concentrated to dryness at reduced pressure. The partially crystalline residue is triturated with hot benzene to yield 6β,19-epoxy-17β-hydroxy-2-oxaandrost-4-en-3-one, melting at about 207–209.5°.

Example 5

To a solution of 26.8 parts of 6β,19-epoxy-17β-hydroxy-2-oxaandrost-4-en-3-one in 560 parts of acetone is added 27 parts by volume of an aqueous solution, 8 N in chromium trioxide and 8 N in sulfuric acid, at such a rate that the temperature is maintained at about room temperature. The resulting reaction mixture is stirred at room temperature for about 7 minutes atfer addition has been completed, after which time isopropyl alcohol is added in order to destroy the excess oxidant. Removal of the solvent by distillation at reduced pressure affords a residue which is extracted with chloroform. The organic layer is separated, washed successively with aqueous potassium bicarbonate and water, then dried over anhydrous sodium sulfate and concentrated to dryness at reduced pressure. Recrystallization of the resulting residue from isopropyl alcohol affords pure 6β,19-epoxy-2-oxaandrost-4-ene-3,17-dione, melting at about 197–200°, and characterized by the following structural formula

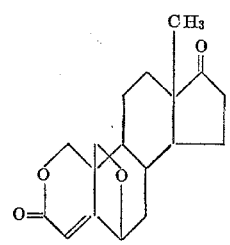

Example 6

To a solution of 22.35 parts of 6β,19-epoxy-2-oxaandrost-4-ene-3,17-dione in 1196 parts of ethanol containing 462 parts of acetic acid and 440 parts of water is added successively 220 parts of zinc dust and 44 parts of cupric acetate. The resulting reaction mixture is heated at the reflux temperature for about 3 hours, then is cooled and filtered. The organic solvent is removed by distillation at reduced pressure, and the crystals which form are separated by filtration and washed on the filter with hot chloroform. The washings and original filtrate are combined, and the layers are separated. The organic layer is washed with water, dried over anhydrous sodium sulfate and stripped of solvent at reduced pressure. The residue thus obtained is dissolved in methanol with the aid of heating, and the resulting solution is cooled to room temperature, then is mixed with a solution of 4.4 parts of sodium hydroxide in 20 parts of water. At the end of about 4 minutes, a solution of 15 parts of potassium bicarbonate in 100 parts of water is added, and the mixture is partially concentrated under reduced pressure. The addition of a solution of 44 parts of potassium bicarbonate in 800 parts of water results in separation of a precipitate which is extracted with chloroform. The chloroform extract is washed with water, dried over anhydrous sodium sulfate and concentrated to dryness at reduced pressure. Recrystallization of that residue from ethyl acetate affords 19-hydroxy-2-oxaandrost-4-ene-3,17-dione, melting at about 231–234°. It is represented by the following structural formula

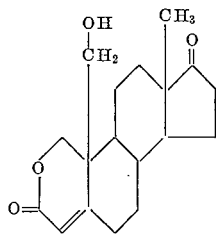

The aqueous alkaline layer obtained as a result of the chloroform extraction described in the previous paragraph is acidified with hydrochloric acid, and that acidic solution is extracted with chloroform. The resulting organic layer is washed with water, dried over anhydrous sodium sulfate and concentrated to dryness at reduced pressure. Recrystallization of the resulting crystalline residue from methylene chloride-ethyl acetate affords pure 19 - hydroxy-2-oxaandrost-5-ene-3,17 - dione, melting at about 186–189°, and represented by the following structural formula

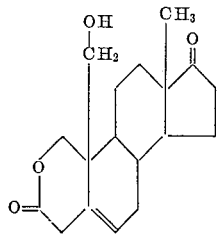

*Example 7*

To a solution of 6 parts of 19-hydroxy-2-oxaandrost-4-ene-3,17-dione in 600 parts of acetone is added, at 0–5° with stirring, 15 parts by volume of an aqueous solution, 8 N in chromium trioxide and 8 N in sulfuric acid. The addition requires about 5 minutes. Stirring is continued at 0–5° for about one hour longer, after which time 5.6 parts of isopropyl alcohol is added in order to destroy excess reagent. The solvent is removed by distillation at room temperature under reduced pressure, and the residue thus obtained is partitioned between chloroform and water. The chloroform layer is separated, washed with water, dried over anhydrous sodium sulfate, and concentrated to dryness under reduced pressure. Crystallization of that residue from benzene yields solvated 10β-carboxy-2-oxaestr-4-ene-3,17-dione, melting at about 105° with decomposition. Recrystallization from ethyl acetate affords pure 10β-carboxy-2-oxaestr-4-ene-3,17-dione, which melts at about 177–183° with decomposition, and is further characterized by the following structural formula

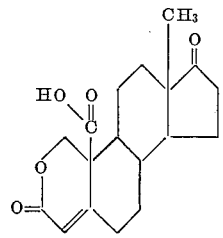

*Example 8*

A solution containing 1.54 parts of the benzene solvate of 10β-carboxy-2-oxaestr-4-ene-3,17-dione, obtained by the procedure of the preceding example, in 15 parts of pyridine is heated on the steam bath, in a nitrogen atmosphere, for about one hour. Removal of the solvent by distillation at reduced pressure affords a residue which is extracted with benzene. The benzene extract is washed successively with cold hydrochloric acid, water, dilute aqueous potassium bicarbonate, and water, then is stripped of solvent by distillation at reduced pressure. Recrystallization of the residue thus obtained from ether-benzene affords pure 2-oxaestr-5(10)-ene-3,17-dione, melting at about 123–126°, while recrystallization from isopropyl alcohol affords a different crystalline modification of that substance, which displays a melting point at about 132–133.5°. This compound is represented by the following structural formula

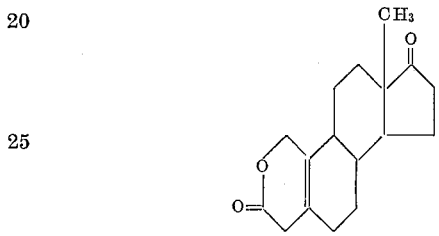

*Example 9*

To a solution of 22.4 parts of 16β,19-epoxy-17β-hydroxy-2-oxaandrost-4-en-3-one in 1200 parts of ethanol containing 460 parts of acetic acid and 440 parts of water is added successively 220 parts of zinc dust and 44 parts of cupric acetate. The resulting reaction mixture is heated at the reflux temperature with vigorous stirring for about one hour, then is cooled and filtered. The filtrate is "worked up" according to the procedure described in Example 6, thus affording the crude product, which is purified by trituration with chloroform to afford 17β,19-dihydroxy-2-oxaandrost-5-en-3-one, melting at about 191–195°. This compound can be represented by the following structural formula

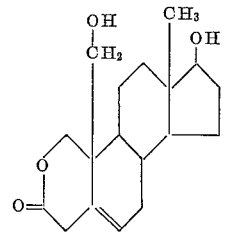

*Example 10*

To a solution of 10 parts of 17β,19-dihydroxy-2-oxaandrost-5-en-3-one in 2960 parts of acetone is added, at 5–7° over a period of about 5 minutes, 40.2 parts by volume of an aqueous solution, 8 N in chromium trioxide and 8 N in sulfuric acid. Stirring at that temperature is continued for about one hour, after which time the excess reagent is destroyed by the addition of approximately 3 parts of isopropl alcohol. The organic solvents are removed by distillation under reduced pressure and the resulting residue is partitioned between water and chloroform. The organic layer is separated, washed with water and extracted with aqueous potassium bicarbonate. The alkaline extracts are cooled to 0–5°, then made acidic by the addition of hydrochloric acid. Extraction of that acidic mixture with chloroform affords an organic solution which is washed with water, dried over anhydrous sodium sulfate and stripped of solvent by distillation under reduced pressure. The residue thus produced is recrystallized from benzene-chloroform to afford 10β-carboxy-2-oxaestr-5-ene-3,17-dione, melting at about 194.5–198°. It can be represented by the following structural formula

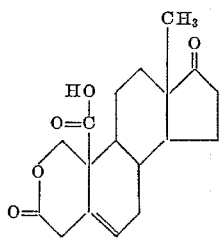

Example 11

To a solution of 7.85 parts of 10β-carboxy-2-oxaestr-5-ene-3,17-dione in 7.85 parts of pyridine is added 47 parts of water, and the resulting reaction mixture is heated, in a nitrogen atmosphere, at the reflux temperature with stirring for about one and one-half hours. The mixture is cooled and extracted with benzene, and the organic layer is separated, washed successively with dilute hydrochloric acid, aqueous sodium hydroxide and water, then dried over anhydrous sodium sulfate and concentrated to dryness in vacuo. The resulting residue is recrystallized from isopropyl alcohol to afford 2-oxaestr-5(10)-ene-3,17-dione, identical with the product of Example 8.

Example 12

To a solution of 5.48 parts of 2-oxaestr-5(10)-ene-3,17-dione in 80 parts of methanol is added a solution of 5 parts of sodium hydroxide in 100 parts of water, and the resulting mixture is heated at about 60° for about 5 minutes, then is allowed to stand for approximately 10 minutes longer. The organic solvent is removed by distillation at reduced pressure, and 100 parts of water followed by 2.5 parts of sodium borohydride are added. The resulting reaction mixture is kept at room temperature for about 6 hours, then is made acidic by the addition of hydrochloric acid. The precipitated crude product is extracted with chloroform, and the chloroform extract is washed successively with dilute aqueous potassium bicarbonate and water, dried over anhydrous sodium sulfate and stripped of solvent by distillation at reduced pressure. Purification of the resulting crude product by recrystallization from benzene affords pure 17β-hydroxy-2-oxaestr-5(10)-en-3-one, melting at about 158–164°, and characterized further by the following structural formula

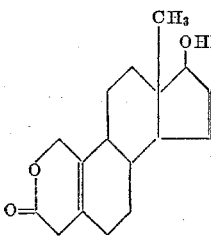

Example 13

To a suspension of 15 parts of magnesium hydroxide in 140 parts of water is added, at about 60°, a solution of 1.5 parts of 2-oxaestr-5(10)-ene-3,17-dione in 112 parts of methanol. The resulting reaction mixture is heated at the reflux temperature, in a nitrogen atmosphere, for about one and one-half hours, then is cooled and filtered. Distillation of the filtrate to dryness under reduced pressure affords a residue which is partitioned between water and chloroform. The organic layer is washed with water, and the combined aqueous solutions are concentrated to dryness under reduced pressure. The resulting residual magnesium salt of 1-hydroxy-17-oxo-1,2-seco-A-norestr-5(10)-en-2-oic acid is dissolved in 36 parts of tetrahydrofuran, and 28 parts by volume of 3 molar ethereal methylmagnesium bromide is added to that solution at room temperature. The reaction mixture is stirred at room temperature under nitrogen for about 2½ hours, and the unreacted reagent is then destroyed by the addition of aqueous tetrahydrofuran. Removal of the solvent by distillation under reduced pressure affords a residue to which is added water and chloroform. That mixture is made acidic by the addition of dilute hydrochloric acid, and the organic layer is separated, washed with water and concentrated to dryness under reduced pressure. The resulting residual lactone is further purified by dissolution in 16 parts of methanol followed by heating with a solution of 0.5 part of sodium hydroxide in 20 parts of water, under nitrogen, for about 15 minutes at steam bath temperature. That mixture is concentrated to dryness, and the residue is partitioned between water and chloroform. The aqueous layer is separated, acidified with dilute hydrochloric acid and extracted with chloroform. The organic layer is washed successively with aqueous potassium bicarbonate and water, then dried over anhydrous sodium sulfate and stripped of solvent under reduced pressure. Purification of the residue by crystallization from benzene results in pure 17β-hydroxy-17α-methyl-2-oxaestr-5(10)-en-3-one, melting at about 164–168°. This compound can be represented by the following structural formula

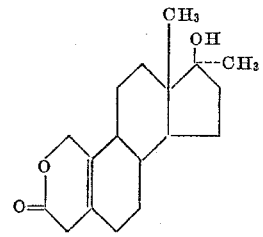

Example 14

The substitution of an equivalent quantity of ethyl magnesium bromide in the procedure of Example 13 results in 17α-ethyl-17β-hydroxy-2-oxaestr-5(10)en-3-one.

Example 15

A solution of 2.5 parts of 17β-hydroxy-2-oxaestr-5(10)-en-3-one in 30 parts of pyridine containing 15 parts of acetic anhydride is kept at room temperature for about 16 hours, then is diluted carefully with water. The resulting aqueous mixture is extracted with chloroform, and the chloroform layer is separated, washed successively with hydrochloric acid, water, and aqueous potassium bicarbonate, then dried over anhydrous sodium sulfate and stripped of solvent under reduced pressure. The resulting residue is crystallized from ether in order to afford pure 17β-acetoxy-2-oxaestr-5(10)-en-3-one, melting at about 139–140.5°. This compound can be represented by the following structural formula

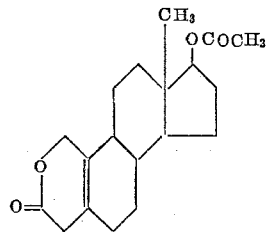

Example 16

When an equivalent quantity of 17β-hydroxy-17α-methyl-2-oxaestr-5(10)-en-3-one is reacted with acetic anhydride and pyridine according to the procedure described in Example 15, except that the mixture is heated at steam bath temperature for 4 hours, 17β-acetoxy-17α-methyl-2-oxaester-5(10)-en-3-one is obtained.

Example 17

The substitution of an equivalent quantity of propionic anhydride in the procedure of Example 15 results in 17β-propionoxy-2-oxaestr-5(10)-en-3-one.

Example 18

A mixture of 3.5 parts of 6β,19-epoxy-17β-hydroxy-2-oxaandrost-4-en-3-one, 35 parts of zinc dust, 73.5 parts of acetic acid, 184 parts of ethanol, and 70 parts of water is heated at the reflux temperature for about 3 hours. At the end of that time, an additional quantity of 35 parts of zinc dust is added, and refluxing is continued for about 4½ hours longer. The reaction mixture is then cooled and filtered, and the filter cake is washed with a mixture of acetic acid, ethanol, and water. The combined filtrate and washings are concentrated to a small volume, and the resulting residue is diluted with water. Extraction of that aqueous mixture with chloroform affords an organic solution which is washed with water, dried over anhydrous sodium sulfate, and concentrated to dryness. The residue is dissolved in 24 parts of methanol, and a solution of 2 parts of sodium hydroxide in 60 parts of water is added. After standing at room temperature for about 3 minutes, the mixture is diluted with a solution of 21 parts of potassium bicarbonate in 150 parts of water. That alkaline solution is extracted with chloroform, and the chloroform layer is distilled to dryness to afford 17β,19-dihydroxy-2-oxaandrost-4-en-3-one, melting at about 245–250°. Recrystallization from chloroform affords the pure material, melting at about 248–251°.

The alkaline layer, obtained from the chloroform extraction described in the preceding paragraph, is acidified with hydrochloric acid, and that mixture is extracted with chloroform. The chloroform extract is washed with water, dried over anhydrous sodium sulfate, and evaporated to dryness under reduced pressure. The resulting residue is recrystalized from chloroform to afford 17β,19-dihydroxy-2-oxaandrost-5-en-3-one, melting at about 198–203°. A further recrystallization, from ethanol, affords the pure substance, melting at about 203–208°.

Example 19

To a solution of 2.6 parts of 17β,19-dihydroxy-2-oxaandrost-5-en-3-one in 264 parts of ethanol containing 105 parts of acetic acid and 100 parts of water is added 100 parts of zinc acetate, and the resulting reaction mixture is heated at the reflux temperature, in a nitrogen atmosphere, for about 23 hours. The mixture is then cooled, diluted with water and extracted with chloroform. The residue remaining after evaporation of the solvent is dissolved in 80 parts of methanol, and a solution of 5 parts of sodium hydroxide in 100 parts of water is added. After about 2 minutes, a solution of 50 parts of potassium bicarbonate in 500 parts of water is added, and that alkaline mixture is extracted with chloroform. Distillation of the solvent under reduced pressure affords 17β,19-dihydroxy-2-oxaandrost-4-en-3-one, melting at about 248–251°. t is represented by the following structural formula

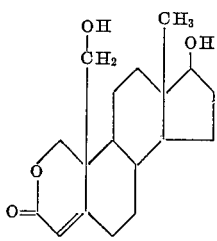

Example 20

When an equivalent quantity of 17β,19-dihydroxy-2-oxaandrost-4-en-3-one or 17β,19-dihydroxy-2-oxaandrost-5-en-3-one is subjected to the successive processes of Examples 10 and 11, 2-oxaestr-5(10)-ene-3,17-dione, identical with the product of Example 11, is produced.

What is claimed is:

1. A compound of the formula

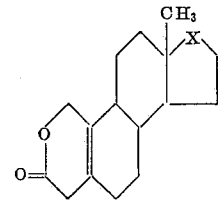

wherein X is selected from the group consisting of carbonyl and

radicals, Y being a member of the class consisting of hydrogen and lower alkanoyl radicals and Z being a member of the class consisting of hydrogen and lower alkyl radicals.

2. 2-oxaestr-5(10)-ene-3,17-dione.
3. 17β-hydroxy-2-oxaestr-5(10)-en-3-one.
4. 17β-acetoxy-2-oxaestr-5(10)-en-3-one.
5. A compound of the formula

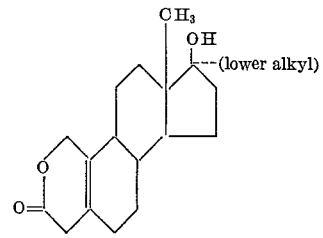

6. 17β-hydroxy-17α-methyl-2-oxaestr-5(10)-en-3-one.
7. A compound of the formula

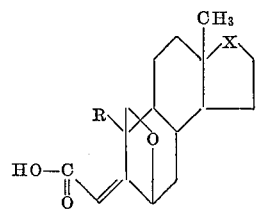

wherein R is selected from the group consisting of formyl and hydroxymethyl radicals and X is selected from the group consisting of carbonyl and β-hydroxymethylene radicals.

8. 6β,19-epoxy-1,17-dioxo-1,2-seco-A-norandrost-3-en-2-oic acid.
9. 6β,19-epoxy-1,17β-dihydroxy-1,2-seco-A-norandrost-3-en-2-oic acid.
10. A compound of the formula

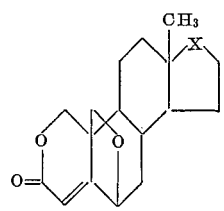

wherein X is selected from the group consisting of carbonyl and β-hydroxymethylene radicals.

11. 6β,19-epoxy-2-oxaandrost-4-ene-3,17-dione.
12. 6β,19-epoxy-17β-hydroxy-2-oxaandrost-4-en-3-one.

13. A compound of the formula

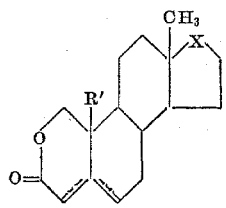

wherein X is a member of the class consisting of carbonyl and β-hydroxymethylene radicals, and R' is selected from the group consisting of hydroxymethyl and carboxy radicals, and the dotted lines indicate an unsaturated linkage selected from the group consisting of a 4,5 and a 5,6 double bond.

14. 19-hydroxy-2-oxaandrost-4-ene-3,17-dione.
15. 19-hydroxy-2-oxaandrost-5-ene-3,17-dione.
16. 10β-carboxy-2-oxaandrost-4-ene-3,17-dione.
17. 17β,19-dihydroxy-2-oxaandrost-5-en-3-one.
18. 10β-carboxy-2-oxaandrost-5-ene-3,17-dione.
19. 17β,19-dihydroxy-2-oxaandrost-4-en-3-one.

No references cited.

WALTER A. MODANCE, *Primary Examiner.*
JAMES A. PATTEN, *Assistant Examiner.*